United States Patent
Cheng

(10) Patent No.: US 6,373,692 B1
(45) Date of Patent: Apr. 16, 2002

(54) SCREWLESS COMPUTER CASE MOUNTING ARRANGEMENT

(75) Inventor: Ying-Yie Cheng, Taoyuan (TW)

(73) Assignee: Mace Tech Corp., Taoyuan (TW)

( * ) Notice: Subject to any disclaimer, the term of this patent is extended or adjusted under 35 U.S.C. 154(b) by 26 days.

(21) Appl. No.: 09/667,795

(22) Filed: Sep. 22, 2000

(51) Int. Cl.[7] .................................................. G06F 1/16
(52) U.S. Cl. ........................ 361/683; 361/725; 361/726; 361/727; 312/223.1; 312/223.2; 292/124; 292/128; 220/4.02
(58) Field of Search ............................... 361/683–686, 361/724–727, 740, 759, 752–757, 831; 292/126, 128, 42, 151, 148, 207, DIG. 38, DIG. 37; 174/35 GC, 35 R; 220/812, 4.02, 216–218; 312/223.1, 263–265, 223.2, 223.3, 204, 257.1; 348/836; 206/706; 248/551–553; 364/708.1; 29/467, 469, 830–832

(56) References Cited

U.S. PATENT DOCUMENTS

| | | | | |
|---|---|---|---|---|
| 4,909,579 A | * | 3/1990 | Liu | 312/208 |
| 5,121,296 A | * | 6/1992 | Hsu | 361/395 |
| 5,392,192 A | * | 2/1995 | Dunn et al. | 312/223.1 |
| 5,446,618 A | * | 8/1995 | Tetsuya et al. | 361/683 |
| 5,713,647 A | * | 2/1998 | Kim | 312/223.2 |
| 5,751,545 A | * | 5/1998 | Jung | 361/683 |
| 5,785,398 A | * | 7/1998 | Park | 312/223.2 |
| 5,823,644 A | * | 10/1998 | Suh et al. | 312/223.2 |

* cited by examiner

Primary Examiner—Leo P. Picard
Assistant Examiner—Michael Datskovsky
(74) Attorney, Agent, or Firm—Troxell Law Office PLLC

(57) ABSTRACT

A screwless computer case mounting arrangement includes a top-open case body, a top cover covered on the case body, a hollow shell mounted in an opening on the top cover, an axle pivoted to the hollow shell on the inside, a retaining member fastened to the axle in the hollow shell and hooked on a locating frame of said case body to secure the top cover and the case body together, a handle fastened to the axle and adapted for turning by hand to disengage the retaining member from the locating frame of the case body, a spring mounted on the axle and adapted for force the retaining member into engagement with the locating frame of the case body, and a lock installed in the case body and adapted to stop the retaining member from movement relative to the case body.

3 Claims, 6 Drawing Sheets

SCREWLESS COMPUTER CASE MOUNTING ARRANGEMENT

BACKGROUND OF THE INVENTION

The present invention relates to a computer case, and more particularly to the mounting arrangement of a computer case, which eliminates the use of screws.

A regular computer case is generally comprised of a substantially rectangular case body, and a top cover covered on the top open side of the case body. The top cover has a substantially ⊓-shaped cross section. After the top cover had been covered on the case body, screws are mounted in respective mounting holes on the top cover and respective mounting holes on the case body to secure the top cover and the case body together. This mounting procedure is complicated. Further, the presence of the screws destroys the sense of beauty of the computer case.

SUMMARY OF THE INVENTION

The present invention has been accomplished to provide a computer case mounting arrangement, which eliminates the aforesaid drawbacks. According, to one aspect of the present invention, the screwless computer case mounting arrangement includes a top-open case body, a top cover covered on the case body, a hollow shell mounted in an opening on the top cover, an axle pivoted to the hollow shell on the inside, a retaining member fastened to the axle in the hollow shell and hooked on a locating frame of said case body to secure the top cover and the case body together, a handle fastened to the axle and adapted for turning by hand to disengage the retaining member from the locating frame of the case body, and a spring mounted on the axle and adapted for force the retaining member into engagement with the locating frame of the case body. According to another aspect of the present invention, a metal shield is fastened to the bottom side wall of the top cover and covered on the opening of the top cover for EMI (electromagnetic interference) protection. According to still another aspect of the present invention, a lock is installed in the case body, and adapted to stop the retaining member from movement relative to the case body.

DETAILED DESCRIPTION OF THE PREFERRED EMBODIMENT

Figure 1:
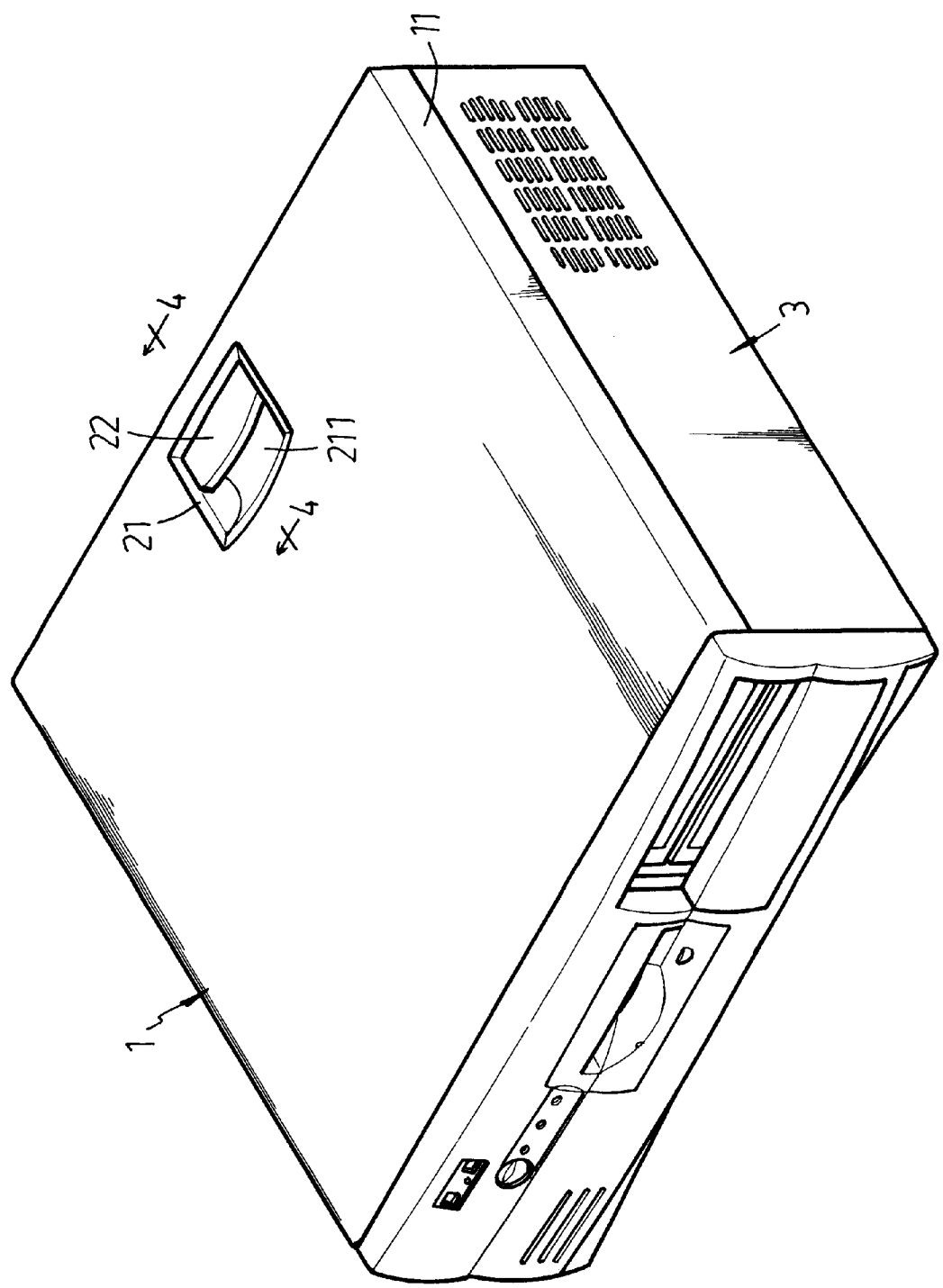
FIG. 1 is an elevational view of the present invention.

Referring to FIGS. From 1 through 4, a top cover, referenced by 1, comprises two vertical side walls 11 downwardly disposed at two opposite lateral sides, a plurality of locating strips 111 respectively protruded from the vertical side walls 11, and a plurality of hooked portions 12 equally spaced along the front side thereof at the bottom. The case body, referenced by 3, is a rectangular, top-open container comprising a plurality of recessed positioning portions 33 equally spaced along two opposite lateral side walls thereof at the top and adapted to receive the locating strips 111 of the top cover 1, enabling the top cover 1 to be positively positioned on the case body 3, a locating frame 31 forwardly extended from the vertical rear side wall thereof, and a plurality of retaining holes 32 aligned at an inwardly extended top flange of the vertical front side wall thereof. The top cover 1 comprises an opening 13 adapted to receive a locking mechanism 2, a plurality of downward flanges 132 disposed around the opening 13, and two eyelets 131 bilaterally formed integral with the downward flanges 132. The locking mechanism 2 comprises a hollow shell 21, a handle 22, and a retaining member 23. The hollow shell 21 is mounted in the opening 13, comprising a top open chamber 211, a peripheral flange 215 extended along the border of the four sides thereof and supported on the top side wall of the top cover 1 around the opening 13, a plurality of hooks 214, a front protruded frame 212, two through holes 2121 aligned at two opposite lateral side walls of the front protruded frame 212, and a plurality of locating rods 213 downwardly disposed at the front side thereof. The top cover 1 comprises a plurality of downward mounting flanges 132 disposed along the four sides of the opening 13, and two eyelets 131 bilaterally formed integral with the downward mounting flanges 132. A shield 14 is fastened to the downward mounting flanges 132 and covered over the hollow shell 21. The shield 14 has a locating hole 141. The handle 22 is suspended in the top open chamber 211 of the hollow shell 21, comprising a plurality of bottom lugs 221 each having a through hole 2211. The retaining member 23 is a flat, elongated base frame 234, and two hooks 231 at two distal ends of the base frame 234. The base frame 234 has a substantially L-shaped cross section, a plurality of positioning slots 232, and a protruded portion 233 forwardly extended from the front side of the base frame 234 on the middle. An axle 223 is inserted through the through hole 2211 of each bottom lug 221 of the handle 22, the through holes 2121 of the shell 21 and the eyelets 131 of the top cover 1, and secured to the eyelets 131 of the top cover 1 by C-shaped retainers 224. The retaining member 23 is fastened to the axle 223. When pulling the handle 22 with the hand, the retaining member 23 is rotated with the axle 223. A spring 222 is sleeved onto the axle 223, having legs 2221 respectively stopped at the bottom side wall of the handle 22 and the top side wall of the front protruded frame 212 of the shell 21. When assembled, the front protruded frame 212 of the shell 21 is supported on the base frame 234 of the retaining member 23, and the locating rods 213 of the shell 21 are respectively inserted into the positioning slots 232 of the retaining member 23.

Figure 4:
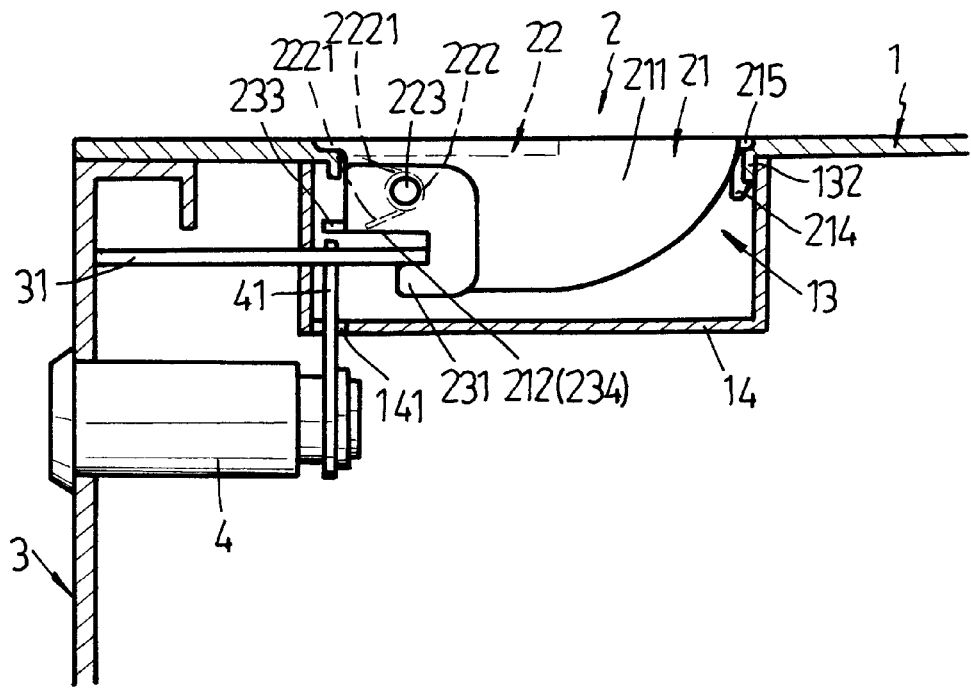
FIG. 4 is a sectional view in an enlarged scale taken along line 4—4 of FIG. 1.
Figure 5:
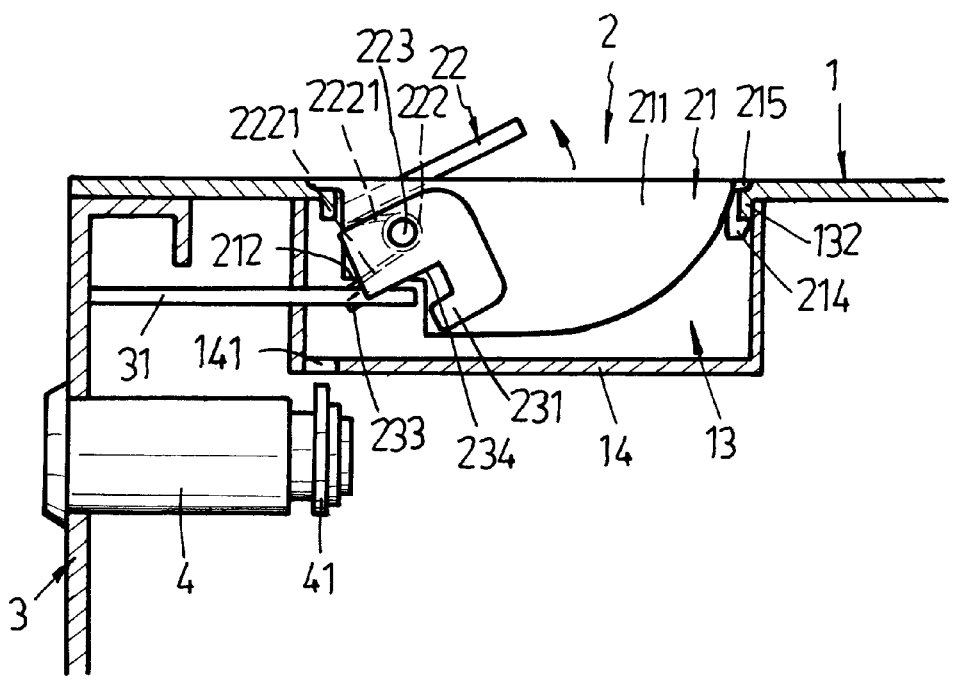
FIG. 5 is similar to FIG. 4 but showing the locked unlocked, the handle turned upwards.
Figure 6:
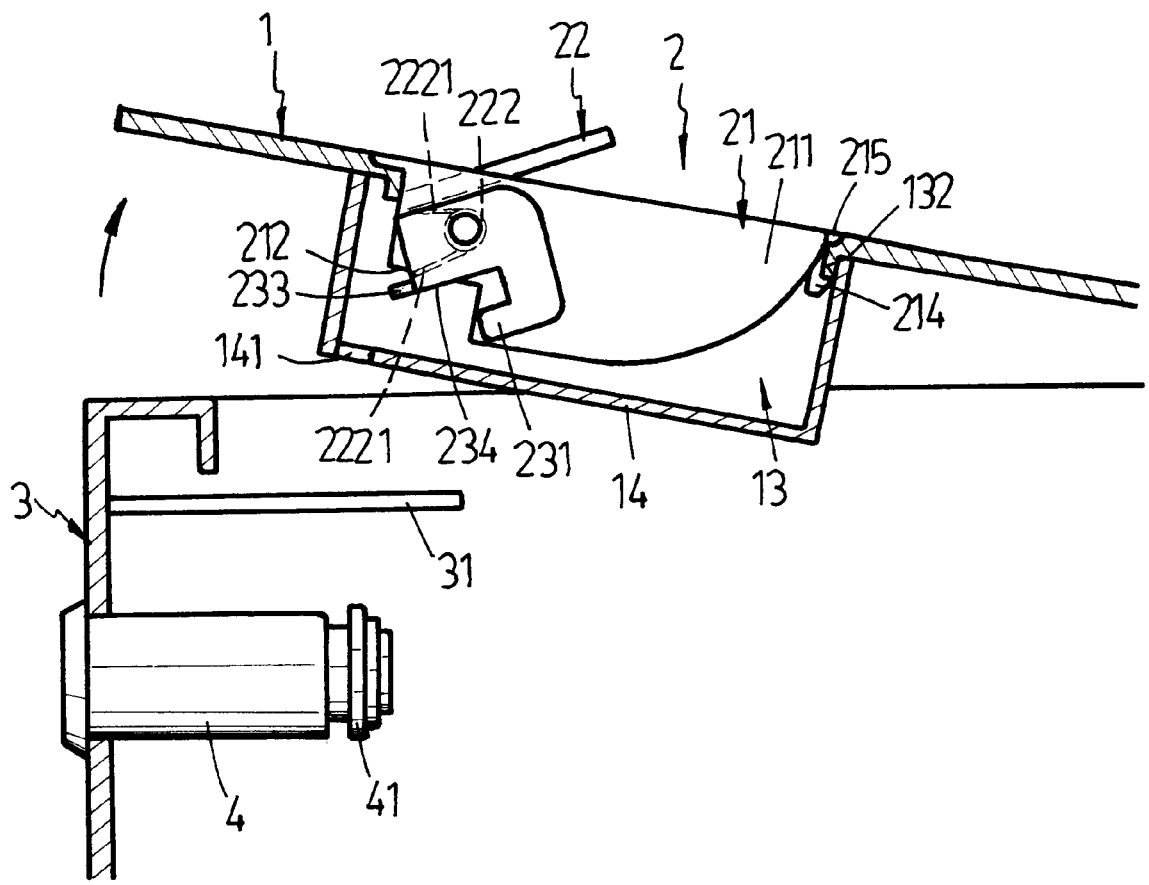
FIG. 6 is similar to FIG. 5 but showing the top cover opened from the case body.

Referring to FIGS. 5 and 6 and FIG. 4 again, the hooks 214 of the shell 21 are respectively hooked on downward flanges 132 of the top cover 1 to hold the shell 21 in place. When pulling the handle 22 upwards, the retaining member 23 is turned with the axle 223 to disengage the hooks 231 from the locating frame 31 of the case body 3. After the handle 22 had been released, the handle 22 and the retaining member 23 are returned to their former position by the spring power of the spring 222.

Figure 2:
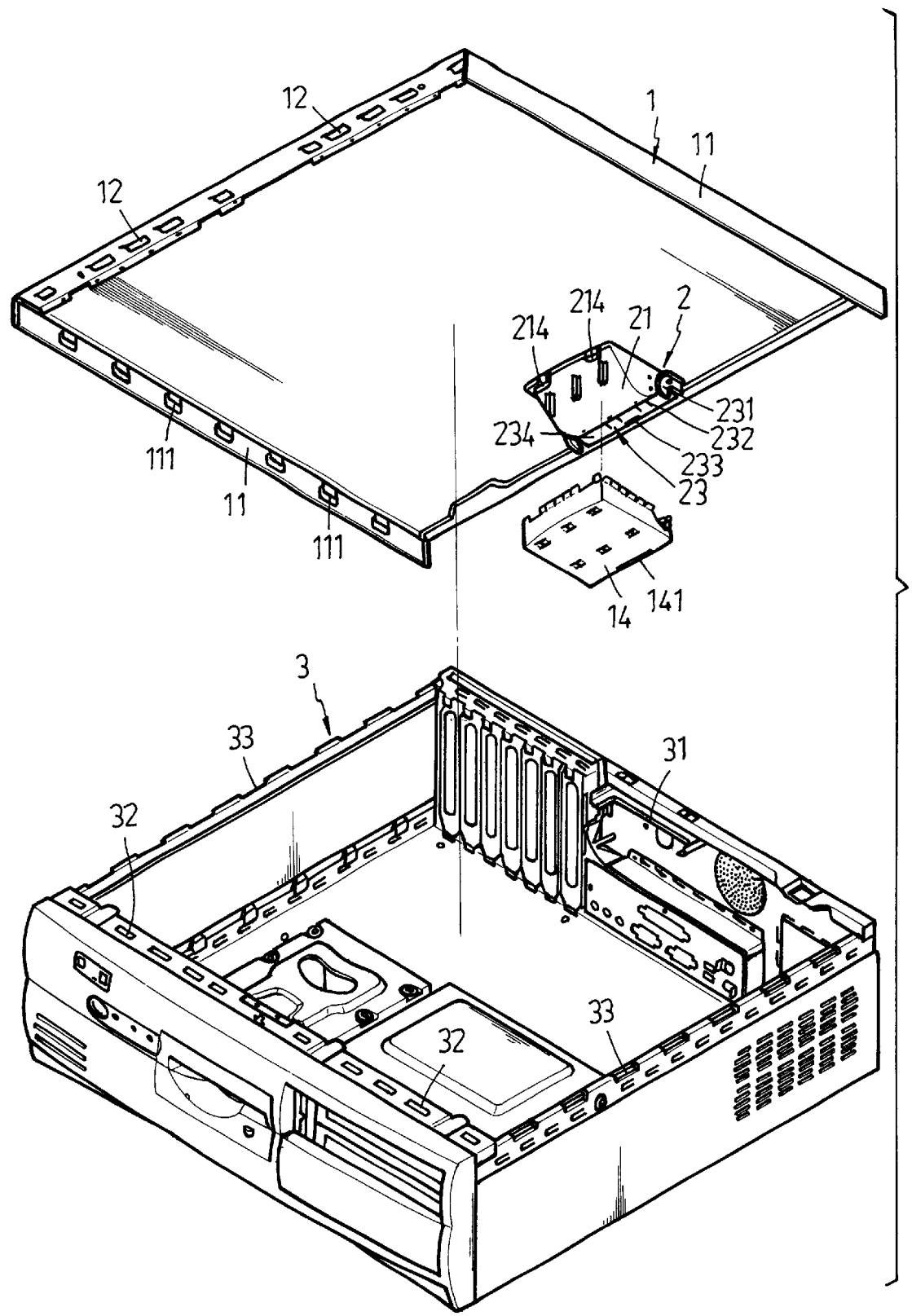
FIG. 2 is an exploded view of the present invention.
Figure 3:
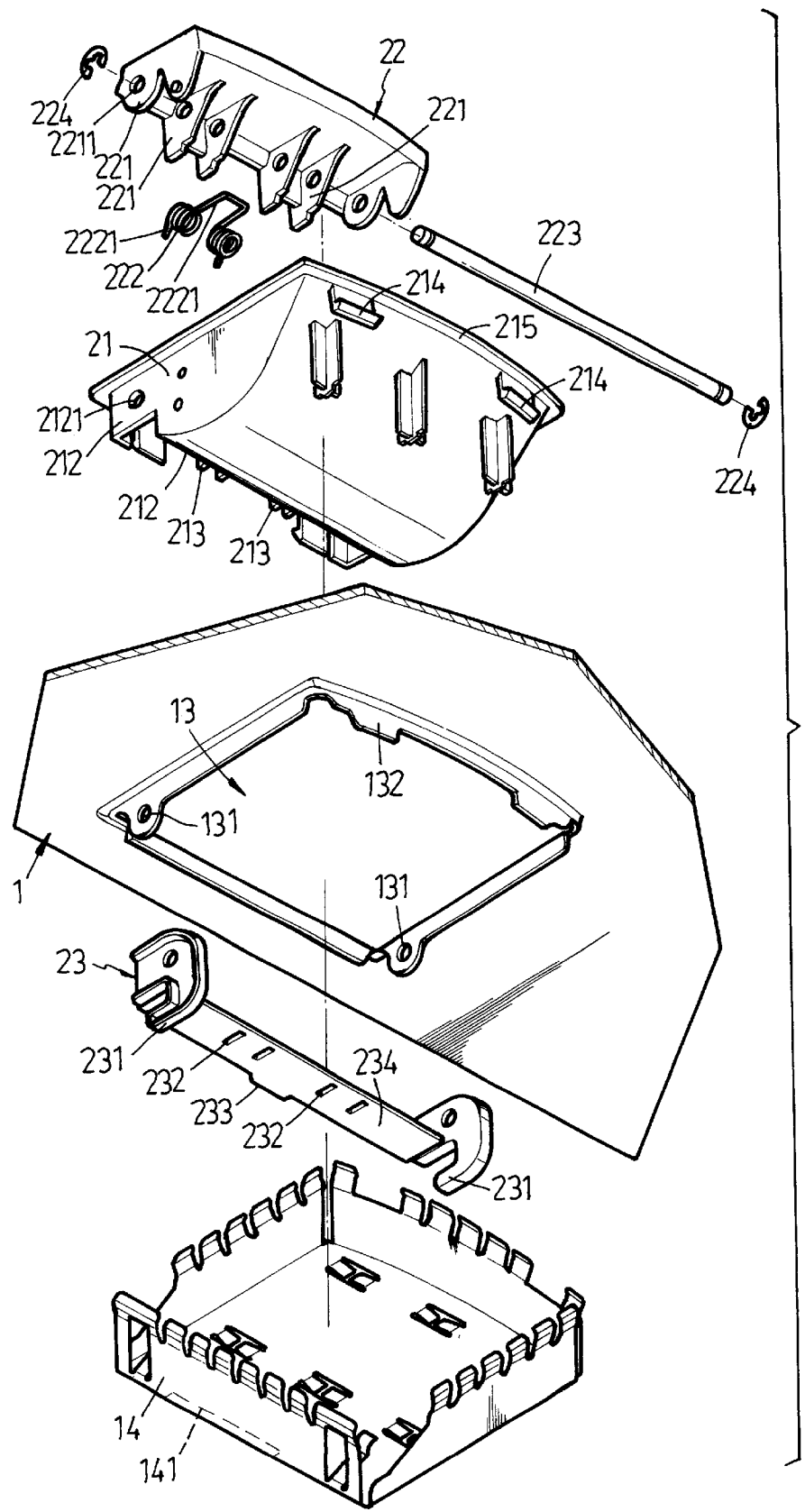
FIG. 3 is an exploded view in an enlarged scale of a part of the present invention.

Referring to FIGS. 2, 4 and 6 again, the shield 14 is made of metal for EMI (electromagnetic interference) protection, having openings at the rear side thereof for the passing of the hooks 231 of the retaining member 23. A lock 4 is installed in the case body 3 below the locating frame 31, having a swivel hook 41 adapted to hook the locating hole 141. After the lock 4 had been locked, the swivel hook 41 is stopped at the bottom side of the protruded portion 233 of the retaining member 23, preventing the retaining member 23 and the handle 22 to be turned with the axle 223.

Figure 7:
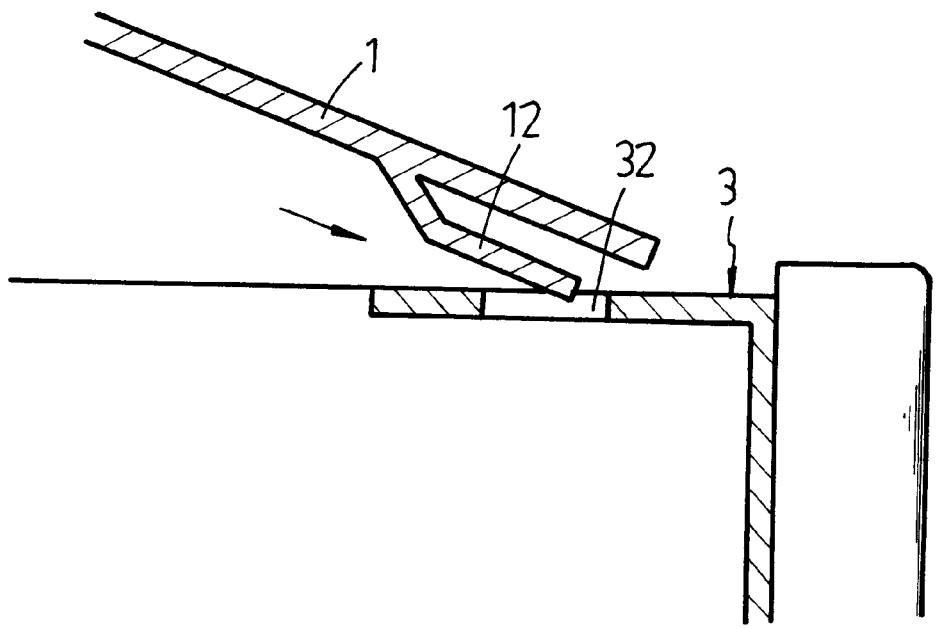
FIG. 7 is a schematic drawing showing the positioning of the hooked portion of the top cover in the corresponding retaining hole of the case body.
Figure 8:
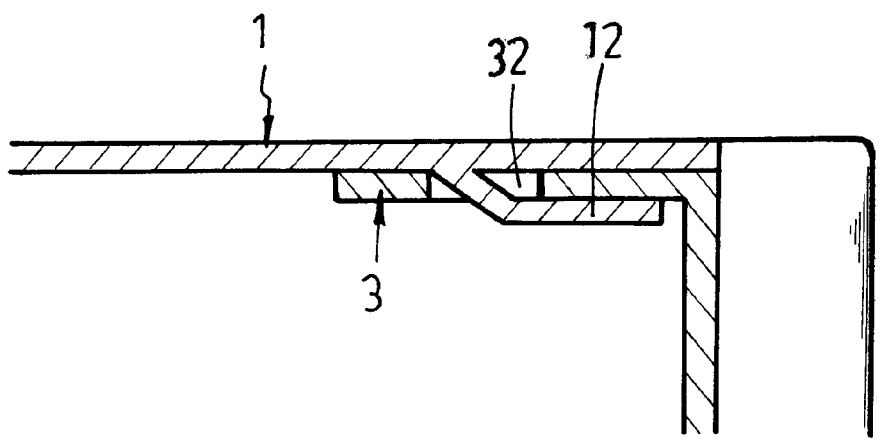
FIG. 8 is similar to FIG. 7 but showing the top cover covered on the case body.

Referring to FIGS. 7 and 8 and FIG. 2 again, the retaining holes 32 of the case body 3 are adapted to receive the hooked portions 12 of the top cover 1. The top cover 1 is tilted and then moved relative to the case body 3 to force the hooked portions 12 into the retaining holes 32, and then the top cover 1 is turned to horizontal to force the locating strips 111 into the recessed positioning portions 33, and at the same time the hooks 231 of the retaining member 23 are respectively hooked on the locating frame 31 of the case body 3. After locking the lock 4, the top cover 1 and the case body 3 are locked.

While only one embodiment of the present invention has been shown and described, it will be understood that various modifications and changes could be made thereunto without departing from the spirit and scope of the invention disclosed.

What the invention claimed is:

1. A screwless computer case mounting arrangement comprising:
    a top-open case body, said case body comprising a top open side, a plurality of recessed positioning portions equally spaced along two opposite lateral side walls thereof at a top side, a locating frame forwardly extended from a vertical rear side wall thereof, and a plurality of retaining holes aligned at an inwardly extended top flange of a vertical front side wall thereof;
    a top cover adapted to cover the top open side of said top-open case body, said top cover comprising a plurality of locating strips adapted for engaging into the recessed positioning portions of said case body, a plurality of hooked portions aligned at a front side thereof and adapted for hooking in the retaining holes of said case body, and an opening disposed near a rear side thereof;
    a hollow shell mounted in the opening of said top cover;
    an axle mounted in said hollow shell and adapted to be rotated relative to said hollow shell;
    a retaining member fastened to said axle for turning with said axle relative to said hollow shell, said retaining member comprising an elongated base frame, two hooks respectively formed integral with two distal ends of said base frame and extended out of said hollow shell and hooked on the locating frame of said case body to lock said top cover, and a plurality of positioning slots spaced on said base frame;
    a handle fastened to said axle in said hollow shell and adapted for pulling by hand to rotate said axle and said retaining member, and to move the hooks of said retaining member away from the locating frame of said case body for enabling said top cover to be disconnected from said case body; and
    spring means mounted on said axle and connected between said handle and said retaining member and adapted to force said retainer member into engagement with the locating frame of said case body.

2. The screwless computer case mounting arrangement of claim 1 further comprising a metal shield fastened to a bottom side wall of said top cover and covered on the opening of said top cover over said retaining member and said hollow shell at a bottom side for electromagnetic interference protection.

3. The screwless computer case mounting arrangement of claim 2 wherein said metal shield comprising a locating hole, and said case body comprises a lock disposed below said locating frame and adapted to lock said top cover, said lock comprising a swivel hook adapted to be turned into the locating hole of said metal shield and stopped against a protruded portion of said retaining member at a bottom side to stop said retaining member from movement relative to said top cover.

* * * * *